UNITED STATES PATENT OFFICE.

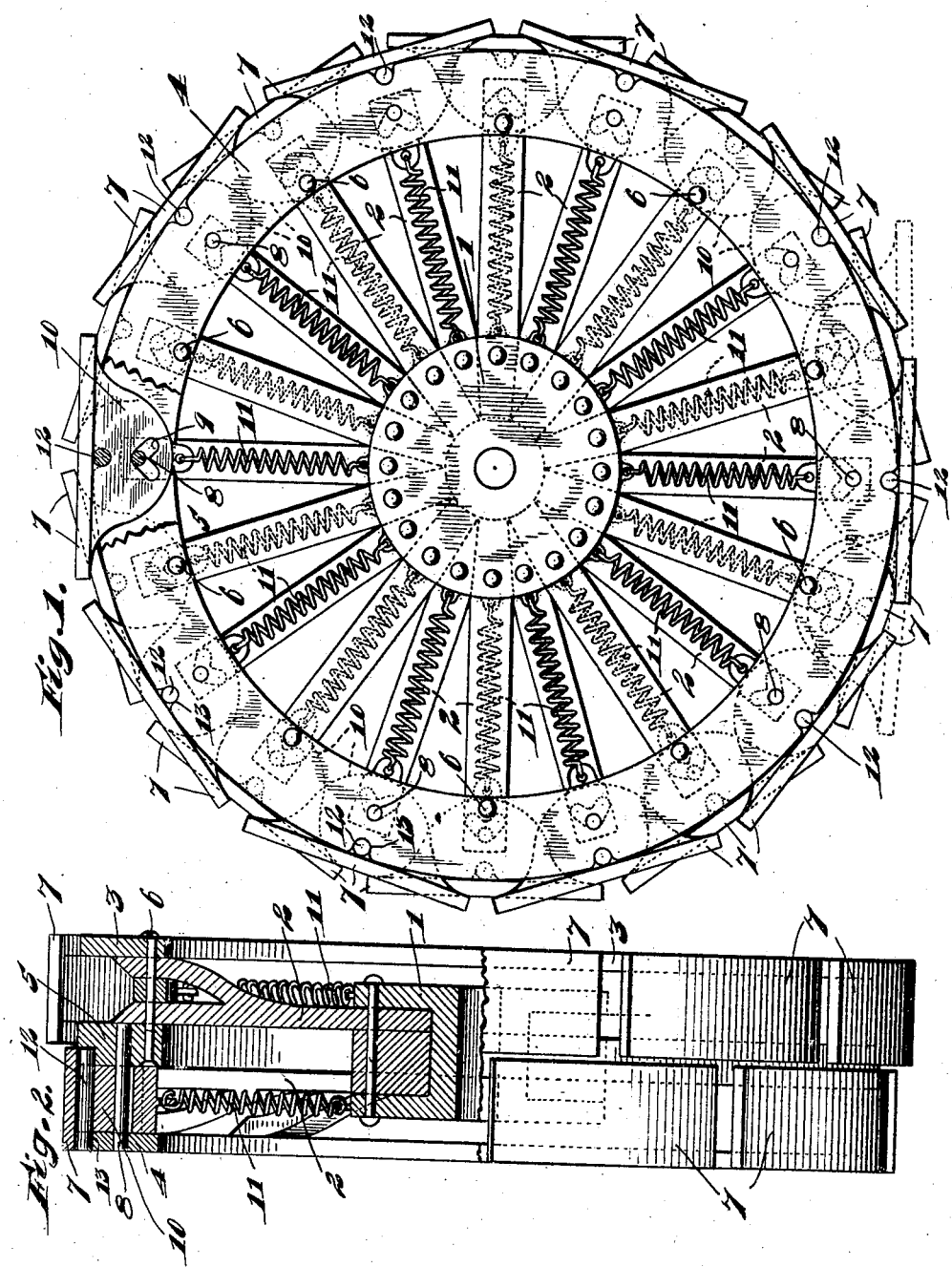

JULIUS A. MAY, OF GENOA, ILLINOIS.

VEHICLE-WHEEL.

1,119,092.  Specification of Letters Patent.  Patented Dec. 1, 1914.

Application filed October 13, 1913. Serial No. 794,926.

*To all whom it may concern:*

Be it known that I, JULIUS A. MAY, a citizen of the United States, and a resident of the city of Genoa, county of Dekalb and State of Illinois, have invented certain new and useful Improvements in Vehicle-Wheels, of which the following is a specification.

My invention relates to improvements in vehicle wheels and has for its object the production of a wheel designed for use especially upon agricultural machinery, or machinery which is required to move over soft ground.

A further object is the production of a vehicle wheel which will be durable and economical in construction, which, when in use will present a maximum purchasing surface for contact with the ground in order to prevent sinking into the ground and skidding or slipping thereon.

A still further object is the production of a vehicle wheel as mentioned which will be of durable and economical construction, and efficient in use.

Other objects will appear hereinafter.

With these objects in view the invention consists in the combinations and arrangements of parts hereinafter described and claimed.

The invention will be best understood by reference to the accompanying drawing forming a part of this specification, and in which, Figure 1 is a side elevation of a vehicle wheel embodying my invention, a portion thereof being broken away and shown in section, and Fig. 2 is a sectional front elevation of the wheel, the upper portion thereof being shown in central section.

The preferred form of construction as illustrated in the drawing comprises a hub 1 from which radiates spokes 2, the inner ends of said spokes being rigidly secured to said hub. Arranged at the outer ends of said spokes are three spaced annular members 3, 4 and 5 which are rigidly connected with the outer ends of said spokes by means of rivets 6. The outer ends of said spokes are preferably bifurcated, as shown in order to adapt the same to hold said annular members in spaced relation, as clearly shown in Fig. 2. Arranged at the periphery of the wheel frame thus formed is a plurality of tread plates 7 arranged as shown in two rows or lines extending about the wheel. Said tread plates are locked to the annular members 3, 4 and 5 by means of transversely extending retainer pins 8 which pass through elongated or substantially crescent formed slots 9 provided in lugs 10 which are formed at the inner sides of said projecting plates and which project into the annular spaces formed between the members 3, 4 and 5. Helical tension springs 11 connected at their inner ends with the hub 1 and at their outer ends with the lugs 10 serve to normally hold the tread plates in central position and with their inner or under surfaces in constant contact with the peripheries of annular members 3, 4 and 5. At the inner or under sides of said tread plates are provided transversely extending pins 12 which engage notches 13 provided in said annular members, this construction evidently preventing creeping of said plates relative to said annular members.

With the construction set forth as the wheel travels along the ground the tread plates at the under side thereof will rock to horizontal position in order to effectually engage the ground and present a maximum purchasing surface. The joints between the tread plates in the two rows thereof are arranged in staggered relation, as shown, so that three of said tread plates will always be in contact with the ground, as clearly shown in Fig. 1. In rocking to horizontal position as said tread plates approach the ground and recede from the same, said plates rock in contact with the peripheries of frame members 3, 4 and 5. This being so it is necessary that slight radial movement be permitted said plates. Such movement is permitted by reason of the elongated or crescent form of the slots 9 which permit of said plates so rocking or moving radially that the under sides thereof will constantly contact with the peripheries of frame members 3, 4 and 5, thereby placing the greatest strain or burden upon said annular members which are so securely braced and connected with the spokes of the wheel as to be best adapted to bear the same. The springs 11, in this rocking of the tread plates of course yield so as to permit of the outward movement thereof serving however, normally to hold said plates in their central positions as shown.

A wheel of the construction set forth will be found of great advantage for agricultural machinery or other vehicles which are required to travel over soft ground since, by reason of the maximum ground engaging or purchasing surface which is presented by a wheel of this construction, the liability of sinking into the ground or of skidding or slipping is reduced to a minimum. The wheel is simple and economical in construction and will be found durable and especially adapted to perform the functions which the same is designed to perform.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In combination, a vehicle wheel having a rim made up of spaced annular members, there being registering peripheral recesses in said members; tread plates on the periphery of said rim; pins carried by said tread plates and each of said pins resting in a pair of said registering recesses, and radially disposed tension springs, each having one end connected with the hub of the wheel and its other end connected with one of said tread plates resiliently maintaining the pins of the latter in said recesses, substantially as described.

2. In combination, a vehicle wheel having a rim made up of spaced annular members, there being registering peripheral recesses in said members; tread plates on the periphery of said rim; pins carried by said tread plates and each of said pins resting in a pair of said registering recesses; lugs on said tread plates extending between members of said rim, each lug having an elongated perforation therethrough; pins through each perforation and two of said annular members; and a tension spring resiliently maintaining said first mentioned pins in their respective recesses, substantially as described.

3. In combination, a vehicle wheel having a rim made up of spaced annular members, there being registering peripheral recesses in said members; tread plates on the periphery of said rim; pins carried by said tread plates and each of said pins resting in a pair of said registering recesses; a lug on each of said tread plates extending between members of said rim, each lug having a crescent formed perforation therethrough, the outer curved side of each perforation being toward the periphery of said rim; a pin through the perforations of each lug and two members of said rim permitting of limited movement to said tread plate on the latter; and means resiliently maintaining said first mentioned pins in their respective recesses and said last mentioned pins at the central portions of their respective crescent formed perforations, substantially as described.

4. In combination, a vehicle wheel having a rim made up of three spaced annular members of equal diameters, there being spaced registering recesses in the peripheries of the intermediate and each outside annular member; tread plates on the periphery of said rim; a lug on each plate extending between two of said annular members, there being registering crescent formed recesses in the lug on each plate; a pin extending laterally through the lug on each plate and disposed in a pair of said registering recesses; a pin through two of said annular members and the crescent formed perforations in the lug of each plate; and springs, each connected at one end to the hub of the wheel and at its other end to the lug of a plate resiliently maintaining the first mentioned pins in their respective recesses and the second mentioned pins at the central portions of their respective crescent formed perforations, substantially as described.

In testimony whereof I have signed my name to this specification in the presence of two subscribing witnesses.

JULIUS A. MAY.

Witnesses:
C. J. BEVAN,
P. J. LAPHAM.

Copies of this patent may be obtained for five cents each, by addressing the "Commissioner of Patents, Washington, D. C."